(12) United States Patent
Jain et al.

(10) Patent No.: US 8,611,940 B2
(45) Date of Patent: Dec. 17, 2013

(54) METHODS AND APPARATUS FOR ENABLING A CHANNEL ACCESS PROTOCOL FOR DIRECTIONAL MAC

(75) Inventors: Avinash Jain, San Diego, CA (US); Hemanth Sampath, San Diego, CA (US); Santosh P. Abraham, San Diego, CA (US); Mohammad Hossein Taghavi Nasrabadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 12/948,601

(22) Filed: Nov. 17, 2010

(65) Prior Publication Data
US 2011/0287796 A1 Nov. 24, 2011

Related U.S. Application Data

(60) Provisional application No. 61/264,523, filed on Nov. 25, 2009, provisional application No. 61/263,272, filed on Nov. 20, 2009.

(51) Int. Cl.
*H04B 7/00* (2006.01)
*H04W 72/00* (2009.01)
(52) U.S. Cl.
USPC .................. 455/509; 455/453; 455/562.1

(58) Field of Classification Search
USPC .................... 455/550.1, 552.1, 436, 453
See application file for complete search history.

(56) References Cited

U.S. PATENT DOCUMENTS

| 7,075,902 | B2* | 7/2006 | El Batt | 370/310 |
|---|---|---|---|---|
| 7,319,684 | B2* | 1/2008 | Tamaki et al. | 370/337 |
| 7,668,138 | B2* | 2/2010 | Abedi | 370/331 |
| 7,826,431 | B2* | 11/2010 | Cave et al. | 370/338 |
| 8,189,526 | B2* | 5/2012 | Hsu et al. | 370/329 |
| 2003/0236103 | A1* | 12/2003 | Tamaki et al. | 455/552.1 |
| 2004/0002357 | A1* | 1/2004 | Benveniste | 455/550.1 |
| 2007/0004415 | A1* | 1/2007 | Abedi | 455/442 |
| 2008/0167047 | A1* | 7/2008 | Abedi | 455/442 |
| 2010/0226343 | A1* | 9/2010 | Hsu et al. | 370/336 |
| 2011/0287796 | A1* | 11/2011 | Jain et al. | 455/509 |

* cited by examiner

*Primary Examiner* — Tilahun B Gesesse
(74) *Attorney, Agent, or Firm* — Dang M. Vo

(57) ABSTRACT

A method and apparatus for providing a channel access protocol for use in a directional communication network is provided. The method may comprise transmitting channel access information to a plurality of apparatuses, receiving a first directional beam from a second apparatus of the plurality of apparatuses, wherein the first directional beam is determined by the second apparatus based on the received channel access information, determining a second directional beam based on the first directional beam, transmitting a channel reservation to the second apparatus using the second directional beam and establishing a communication session with the second apparatus based on the channel reservation.

52 Claims, 11 Drawing Sheets

METHODS AND APPARATUS FOR ENABLING A CHANNEL ACCESS PROTOCOL FOR DIRECTIONAL MAC

CROSS-REFERENCE TO RELATED APPLICATION(S)

The present application for Patent claims priority to Provisional Application No. 61/263,272, entitled "METHODS AND APPARATUS FOR ENABLING A CHANNEL ACCESS PROTOCOL FOR DIRECTIONAL MAC," filed Nov. 20, 2009, and Provisional Application No. 61/264,523, entitled "METHODS AND APPARATUS FOR ENABLING A CHANNEL ACCESS PROTOCOL FOR DIRECTIONAL MAC," filed Nov. 25, 2009, the content of which are expressly incorporated by reference herein.

BACKGROUND

1. Field

The present disclosure relates generally to communication systems, and more particularly, to provide a channel access protocol for use in a directional communication network.

2. Introduction

In order to address the issue of increasing bandwidth requirements that are demanded for wireless communications systems, different schemes are being developed to allow multiple user terminals to communicate by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard.

Generally, wireless communications systems specified by the IEEE 802.11 standard have a central entity, such as an access point (AP)/point coordination function (PCF) that manages communications between different devices, also called stations (STAs). By contrast, a directionally based communications system may use a decentralized communications structure.

Further, a decentralized system using directional communications may experience issues associated with channel access, blindness, scheduling management, and the like. As such, a method and apparatus for providing provide a channel access protocol for use in a directional communication network is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing provide a channel access protocol for use in a directional communication network. According to one aspect, a method for provide a channel access protocol for use in a directional communication network is provided. The method can include transmitting channel access information to a plurality of apparatuses. Further, the method can include receiving a first directional beam from a second apparatus of the plurality of apparatuses, wherein the first directional beam is determined by the second apparatus based on the transmitted channel access information. Still further, the method can include determining a second directional beam based on the first directional beam. Additionally, the method can include transmitting a channel reservation to the second apparatus using the second directional beam. Moreover, the method can include establishing a communication session with the second apparatus based on the channel reservation.

Another aspect relates to a computer program product comprising a computer-readable medium. The computer-readable medium can include code for transmitting channel access information to a plurality of apparatuses. Further, the computer-readable medium can include code for receiving a first directional beam from a second apparatus of the plurality of apparatuses, wherein the first directional beam is determined by the second apparatus based on the transmitted channel access information. Still further, the computer-readable medium can include code for determining a second directional beam based on the first directional beam. Additionally, the computer-readable medium can include code for transmitting a channel reservation to the second apparatus using the second directional beam. Moreover, the computer-readable medium can include code for establishing a communication session with the second apparatus based on the channel reservation.

Yet another aspect relates to an apparatus. The apparatus can comprise means for transmitting channel access information to a plurality of apparatuses. Further, the apparatus can comprise means for receiving a first directional beam from a second apparatus of the plurality of apparatuses, wherein the first directional beam is determined by the second apparatus based on the transmitted channel access information. Still further, the apparatus can comprise means for determining a second directional beam based on the first directional beam. Additionally, the apparatus can comprise means for transmitting a channel reservation to the second apparatus using the second directional beam. Moreover, the apparatus can comprise means for establishing a communication session with the second apparatus based on the channel reservation.

Another aspect relates to a station. The station can include an antenna. Further, the station can include a transmitter coupled to the antenna, configured to transmit channel access information to a plurality of apparatuses. Additionally, the station can include a receiver coupled to the antenna, configured to receive a first directional beam from a second apparatus of the plurality of apparatuses, wherein the first directional beam is determined by the second apparatus based on the transmitted channel access information. Still further, the station can include a processing system configured to: determine a second directional beam based on the first directional beam. Additionally, the transmitter may be further configured to transmit a channel reservation to the second apparatus using the second directional beam. Moreover, the processing system may be further configured to establish a communication session with the second apparatus based on the channel reservation.

Another aspect relates to an apparatus. The apparatus can include a transmitter configured to transmit channel access information to a plurality of apparatuses. Additionally, the apparatus can include a receiver configured to receive a first directional beam from a second apparatus of the plurality of apparatuses, wherein the first directional beam is determined by the second apparatus based on the transmitted channel access information. Further, the apparatus can include a processing system configured to: determine a second directional beam based on the first directional beam. Still further, the transmitter may be further configured to transmit a channel reservation to the second apparatus using the second directional beam. Moreover, the processing system may be further configured to establish a communication session with the second apparatus based on the channel reservation.

According to another aspect, a method for deferring transmissions in a directional communication network is provided. The method can include receiving, by a first apparatus, a channel access information transmission from a second apparatus. Further, the method can include determining the channel access information is not intended for the first apparatus. Still further, the method can include determining a direction from which the channel access information transmission was received. Moreover, the method can include deferring transmissions, from the first apparatus, in the direction from which the channel access information transmission was received.

Another aspect relates to a computer program product comprising a computer-readable medium. The computer-readable medium can include code for receiving, by a first apparatus, a channel access information transmission from a second apparatus. Further, the computer-readable medium can include code for determining the channel access information is not intended for the first apparatus. Still further, the computer-readable medium can include code for determining a direction from which the channel access information transmission was received. Moreover, the computer-readable medium can include code for deferring transmissions, from the first apparatus, in the direction from which the channel access information transmission was received.

Yet another aspect relates to an apparatus. The apparatus can comprise means for receiving, by a first apparatus, a channel access information transmission from a second apparatus. Further, the apparatus can comprise means for determining the channel access information is not intended for the first apparatus. Still further, the apparatus can comprise means for determining a direction from which the channel access information transmission was received. Moreover, the apparatus can comprise means for deferring transmissions, from the first apparatus, in the direction from which the channel access information transmission was received.

Another aspect relates to a station. The station can include an antenna. Further, the station can include a receiver coupled to the antenna, configured to receive, by the station, a channel access information transmission from a second apparatus. Still further, the station can include a processing system configured to: determine the channel access information is not intended for the first apparatus, determine a direction from which the channel access information transmission was received, and defer transmissions, from the station, in the direction from which the channel access information transmission was received.

Another aspect relates to an apparatus. The apparatus can include a receiver configured to receive a first directional beam from a second apparatus of the plurality of apparatuses, wherein the first directional beam is determined by the second apparatus based on the received channel access information. Further, the apparatus can include a processing system configured to: determine a second directional beam based on the first directional beam. Still further, the transmitter may be further configured to transmit a channel reservation to the second apparatus using the second directional beam. Moreover, the processing system may be further configured to establish a communication session with the second apparatus based on the channel reservation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

These and other sample aspects of the invention will be described in the detailed description that follow, and in the accompanying drawings, wherein.

Figure 1:
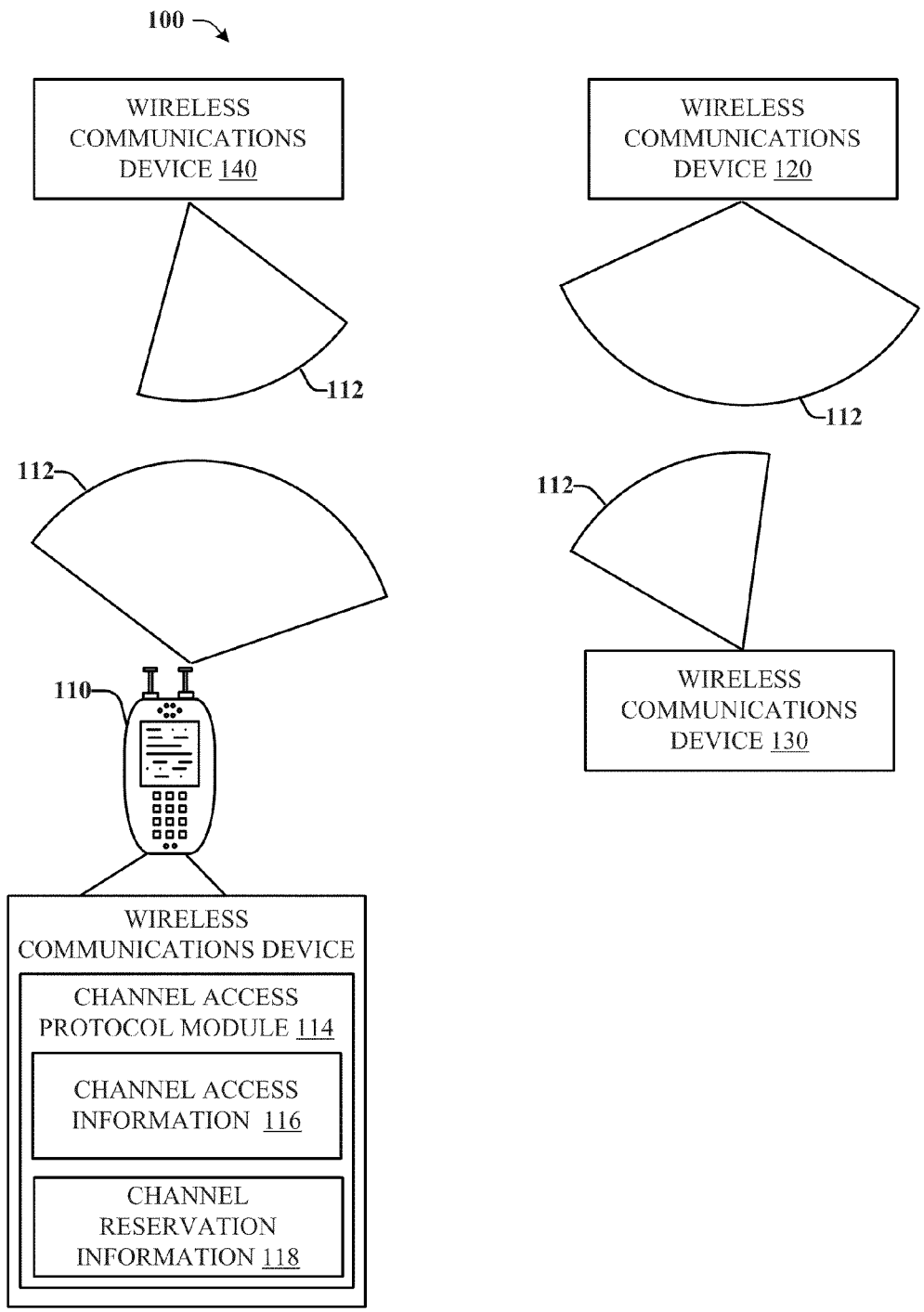
FIG. 1 illustrates a block diagram of a communication network according to an aspect.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of methods and apparatus are described more fully hereinafter with reference to the accompanying drawings. These methods and apparatus may, however, be embodied in many different forms and should not be construed as limited to any specific structure or function presented throughout this disclosure. Rather, these aspects are provided so that this disclosure will be thorough and complete, and will fully convey the scope of these methods and apparatus to those skilled in the art. Based on the descriptions herein teachings herein one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure herein may be embodied by one or more elements of a claim.

Generally, directionally based communications may refer to use of directional antennas at a transmitter and receiver to obtain beamforming gains. According to equation (1), (e.g. Friis equation):

$$P_{RX} = \frac{G_{TX} G_{RX} c^2}{(4\pi d)^2 f_c^2} \times \frac{1}{\sigma \cdot N_f} P_{TX} \qquad (1)$$

Receive power ($P_{RX}$) and hence the received signal-to-noise ratio at the receiver may be proportional to the product of antenna gains at the transmitter $G_{TX}$ and the receiver $G_{RX}$. At high frequencies, such as 60 GHz, signal attenuation may be large and a high beamforming gains (e.g. of the order of 20 dB) may be used for line-of-sight (LOS) communication even over a small range, such as 10 meters.

Directionally based communications have additional benefits. For example, beamforming may create spatial isolation. The spatial isolation is a result of directional transmission. The signal may be attenuated in directions other than the direction of receive and transmit beams. Further, the signal may not be decoded in other directions and may not interfere with devices outside the direction of communication. This may create a possibility of spatial reuse, e.g. multiple peer devices able to communicate with each other contemporaneously.

While there are benefits to directional transmissions, challenges are also created for using a directional MAC protocol that enables directional communication. By contrast, wireless communication networks specified by 802.15.3 may have a central entity, such as a point coordinating function (PCF), which may manage the communication between different devices. Having a central entity may simplify design of communication protocols. Further, although any device capable of transmitting a beacon signal may serve as an AP, for an AP to be effective it may have to have a good link quality to all STAs in a network. At high frequencies, where signal attenuation may be relatively severe, communications may be directional in nature and may use beamforming (e.g. beam training) to increase gains. As such, an AP may stratify the following responsibilities to be effective. The AP may have a large sector bound (e.g. a wide steering capability). The AP may have a large beamforming gain (e.g. multiple antennas). The AP may be mounted so that a line of sight path exists to most areas in a network, such as on a ceiling. The AP may use a steady power supply for periodic beacon transmissions and other management functions.

Mobile wireless communications devices (WCD) (e.g. laptops, smartphones, etc.) may have comparatively reduced capabilities to that of a traditional AP due to factors such as cost, power, form factor, etc. For example, antenna steering capability may be limited to a small sector bound, available power may be limited, location may be variable, etc. Even with these limitations, WCDs may be asked to perform as APs to form peer-to-peer networks for various purposes, such as side-loading, file sharing, etc. For example, WCDs may be asked to form peer-to-peer networks where no device may efficiently transmit to and receive from all other devices.

Further, before two apparatus may start communicating, they have to discover each other and one of them may inform the other that it has data to send. Further, since the two apparatus may be unaware to the presence of other and the direction of communication, discovery may become challenging and has to consider communications over a range of possible directions.

Additionally, assuming a system has three apparatus: A, B and C. Further, assume A seeking to initiate communications with C. However, a receive beam direction for C may be pointing towards B since C may be expecting to communicate from B. In such an exemplary aspect, an attempt from A to communicate with C may fail and A may be unaware if the failure happened because of collision, loss of channel or C's unavailability. Further, if A employs some sort of random backoff protocol, then the backoff may become large and delay communication with C when C is available.

Still further, in one aspect, an apparatus transmitter that initiates a transmission may not aware if the receiver is receiving large amounts of interference. In such an aspect, the transmitter may not reserve a channel. In 802.11, this problem is addressed using a RTS/CTS (Request-to-send/Clear-to-send) protocol. Using a RTS control frame, a transmitter may let neighboring apparatuses know that it is planning a transmission and the apparatuses that process the RTS may backoff from accepting any request to transmit. After the intended receiver receiving RTS, the receiver may use a CTS control frame to let the neighboring apparatuses know that the receiver may receive a packet for a certain duration. Further, the neighboring apparatuses that process the CTS may backoff from transmitting for that duration. However, the current 802.11 RTS-CTS protocol is not directional.

Yet further, in a channel environment, receive and transmit beam directions may change due to changes in conditions (e.g. path blockage, etc.). As such frequent beam training may be used to maintaining a sufficient SNR at the receiver. However, such beam training may use a transmitter transmitting in different directions. These transmissions in different directions may disturb any kind of spatial reuse being assumed by other devices.

Several aspects of a wireless network will now be presented with reference to FIG. 1. The wireless communication system 100 is shown with several wireless nodes, generally designated as nodes 110, 120, 130 and 140, wherein the several nodes 110, 120, 130 and 140 may communicate using a directionally based protocol which allows communicates within a defined coverage region 112. As used herein, a wireless node 110, 120, 130 and 140 may be referred to as a wireless communications device (WCD), user equipment (UE), a laptop, apparatus, etc. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, a WLAN device, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless communication system 100 may support access terminals distributed throughout a geographic region.

An access terminal, which may be fixed or mobile, may use backhaul services of an access point or engage in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

Generally, as depicted in FIG. 1, multiple wireless nodes 110, 120, 130 and 140 may be distributed throughout a geographic region in such a manner than no one wireless node may communication with all other nodes. For example, WCD 140 may communicate with WCD 110 and WCD 130 but not WCD 120. Further, each wireless node may have a different coverage region 112 over which it may communicate. For example, WCD 140 may have small coverage region than WCD 110.

In operation, a peer-to-peer network may be established between multiple wireless nodes. For example WCD 110 may be actively communicating with WCD 120 (e.g., a laptop may be downloading files to a printer). Further WCD 130 may seek to initiate communications with WCD 110, while WCD 140 may seek to initiate communications with WCD 120. Further, these kinds of communication may be triggered any time. Still further, the WCDs may not aware of the beam directions for communication with their peer devices. Further due to motion involved in the location of devices, the beam directions may change from time to time.

Furthermore, WCD 110 may include channel access module 114. Channel access module 114 may be operable to enable a hierarchical RTS-CTS based protocol. In one aspect, the hierarchical RTS-CTS may be described as an extension of RTS-CTS protocol used in 802.11 for channel (medium) reservation. Use of the hierarchical RTS-CTS protocol may resolve deafness problems in a directional MAC, as RTS and CTS messages may be sent during a control period when all other devices in the network are listening in all available directions.

Channel access module 114 may further be described with reference to two features. Firstly, a discovery and beam streaming process and secondly a data transmission process. With respect to apparatus discovery and beam tracking, channel access information 116 may be used when WCD 110 initiates a connection with a peer WCD, both RTS and CTS may sent in all available directions using: a (quasi) omni-directional antenna, or over multiple receive direction using multiple time slots for transmissions. In one aspect, Both RTS and CTS may include a field to indicate if the receiver or the transmitter may perform beam training with its peer apparatus. For example, when the field is set, not only is the peer apparatus aware that the apparatus is seeking beam training, but all other apparatuses that are able to decode either the RTS or the CTS may not transmit in the received direction for the duration of time reserved by RTS or CTS. With respect to the data transmission, upon completion of beam training, channel reservation module 118 may know an optimal transmit direction which covers the best receive beam direction. As such, RTS and CTS may therefore used for channel reservation only in the direction of communication. Further, in one aspect, RTS and CTS may use broader beams that cover the narrower beams used for transmission of traffic data and/or RTS-CTS may be multi-directional. Additionally, spatial reuse may be at a maximum when RTS and CTS are unidirectional.

The wireless communication system 100 may support MIMO technology. Using MIMO technology, multiple access terminals 120 may communicate simultaneously using Spatial Division Multiple Access (SDMA). SDMA is a multiple access scheme which enables multiple streams transmitted to different receivers at the same time to share the same frequency channel, or communicate using different frequencies, and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 110, 130 to recover the data stream destined for that access terminal 110, 130. On the uplink, each access terminal 110, 130 transmits a spatially precoded data stream, which enables the identity of the source of each spatially precoded data stream to be known.

One or more access terminals 110 may be equipped with multiple antennas to enable certain functionality. With this configuration, multiple antennas at the access terminal 110 may be used to communicate to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access terminal 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention is not limited to any particular wireless technology and/or air interface standard.

The wireless node (e.g., 110, 130), whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Further discussion of the MAC and PHY layers is provided with reference to FIG. 3. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

Figure 2:
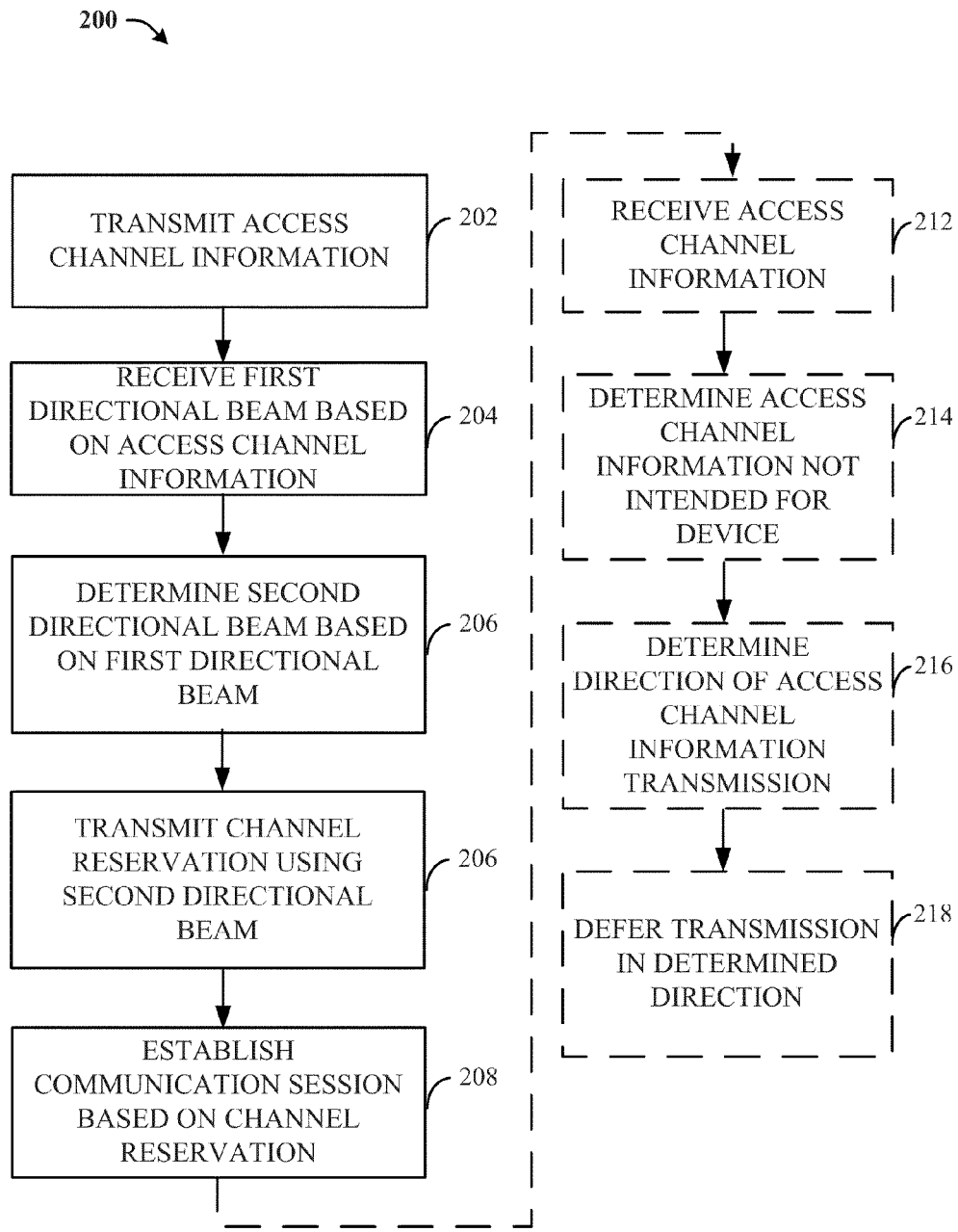
FIG. 2 is a flowchart of an aspect of a channel access protocol for a directional communication network.

FIG. 2 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, a methodology 200 to provide a channel access protocol for use in a directional communication network is illustrated. At reference numeral 202, access channeling information may be transmitted. In one an aspect, channel access information may include a request message to determine at least one of the presence or location of an apparatus. In another aspect, channel access information may include a field for beam training information. At reference numeral 204, a first directional beam may be received, where the first directional beam may be determined by a second apparatus based on the transmitted channel access information. In one aspect, first directional beam may indict the presence of at least one apparatus. In another aspect, the location of the at least one apparatus may also be received. At reference numeral 206, a second directional beam may be determined from the first directional beam. In one aspect, determining the second directional beam may include beam training. At reference numeral 208, a channel reservation may be transmitted using the second directional beam. At reference numeral 210, a communication session may be established with the apparatus based on the channel reservation. In one aspect, RTS and CTS may use broader beams that cover the narrower beams used for transmission of traffic data and/or RTS-CTS may be multi-directional. In another aspect, the communication session may be established using a IEEE 802.11 protocol. IEEE 802.11 denotes a set of Wireless Local Area Network (WLAN) air interface standards developed by the IEEE 802.11 committee for short-range communications (e.g., tens of meters to a few hundred meters) For example, 802.11 ad/ac/a/b/g/n.

Additionally or optionally, at reference numeral 212, a device may receive a channel access information transmission. Further, optionally, at reference numeral 214, the device may determine the access information transmission is not intended for it. Optionally, at reference numeral 216, the device may determine the direction from which the channel access information transmission was received. And optionally, at reference numeral 218, the device may defer transmissions in the determined direction. In one aspect, the device may defer transmissions for a duration indicated by the channel access information. In another aspect, the duration may be indicated through a RTS message.

Figure 3:
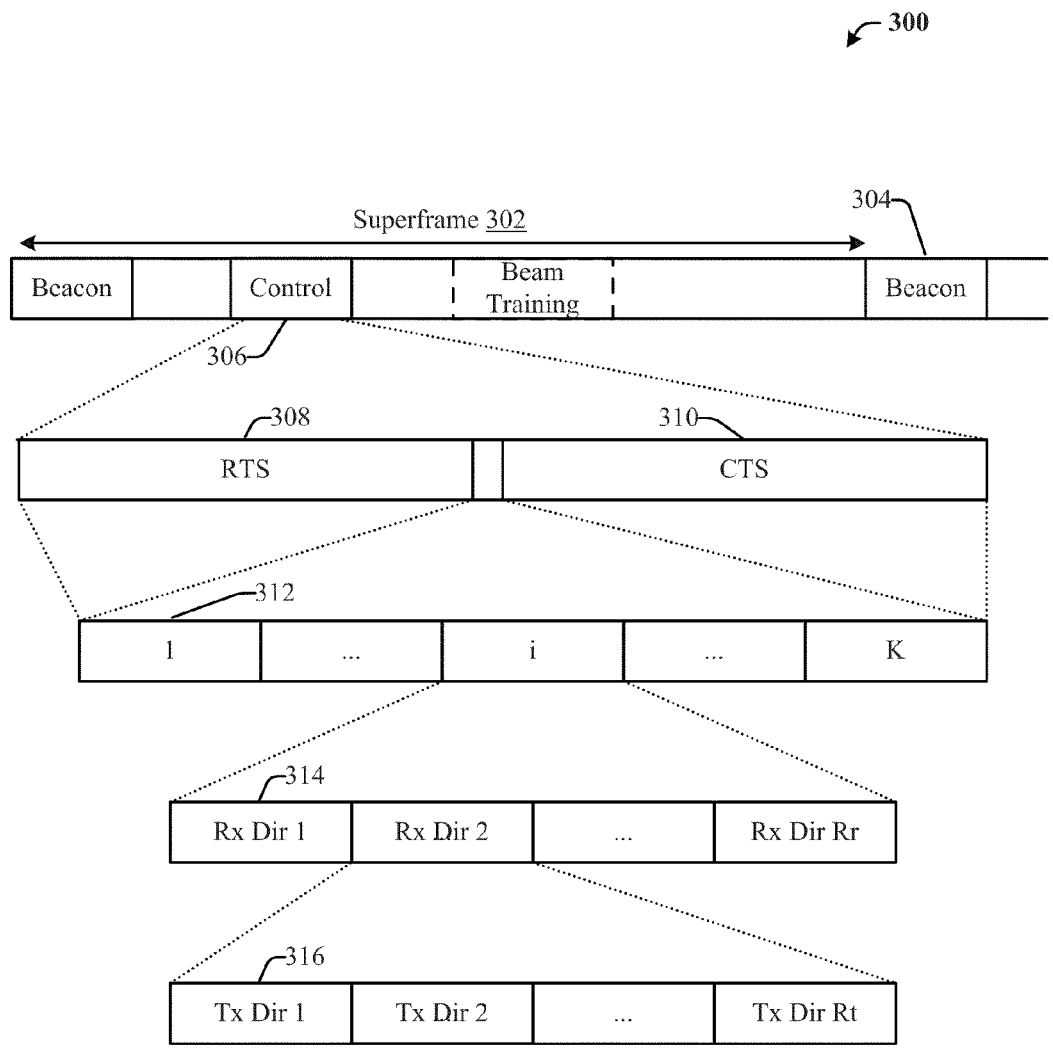
FIG. 3 illustrates a superframe block diagram with multiple RTS-CTS periods within the superframe according to an aspect.

With reference to FIG. 3, an example superframe block diagram 300 with multiple RTS-CTS periods within the superframe is depicted. A period between successive beacon transmissions 304 may be refers to as a superframe 302. Further, within the superframe 302, a control interval 306. Further a part of the control period 306 may be used for sending a RTS frame 308 while another part of it is used in sending a CTS frame 310. In the depicted aspect, an RTS period 308 may be divided into multiple time slots 312 and RTS control frame 314 may be sent in one of these times slots. Similarly a CTS frame 310 may be divided into multiple time slots 312 and CTS response frame 316 may be sent in one of the time slots.

Figure 4:
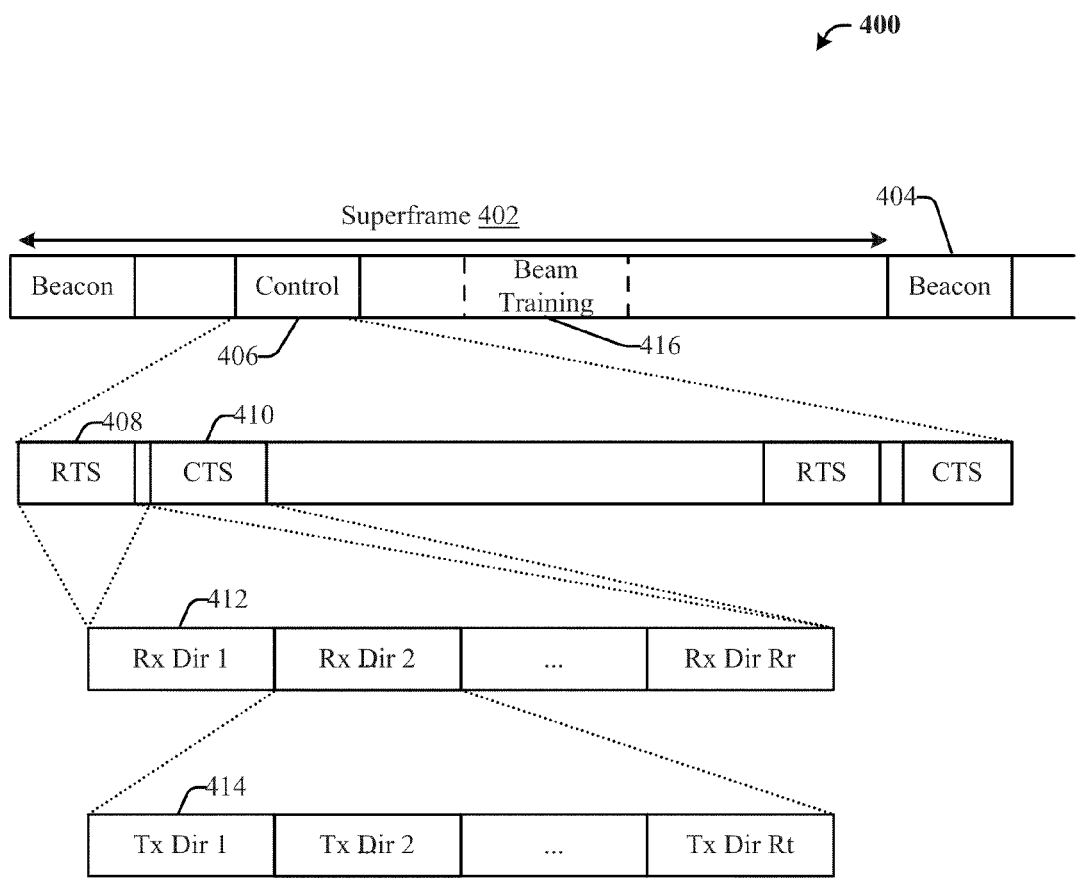
FIG. 4 illustrates another superframe block diagram with multiple RTS-CTS periods within the superframe according to an aspect.

With reference to FIG. 4, another example superframe block diagram 400 with multiple RTS-CTS periods within the superframe is depicted. A period between successive beacon transmissions 404 may be refers to as a superframe 402. Further, within the superframe 402, a control interval 406. Further a part of the control period 406 may be used for sending a RTS frame 408 and a CTS frame 410 where RTS and CTS time slots are contiguous. In the depicted aspect, an RTS control frame 412 may be sent in one of time slots. Similarly a CTS response frame 414 may be sent in one of the time slots. Further, Multiple time slots (e.g., K in FIGS. 3 and 4) may reduce the possibility of collision when multiple STAs are sending RTS or CTS.

Note that however there are many such possibilities than illustrated in FIGS. 3 and 4. For example, in another aspect, a control frame does not explicitly specify the RTS and CTS time periods, but each STA may randomly choose some part of the control for transmitting RTS frame and CTS is send some delay after the RTS.

Each of the time slots may be further divided into units of time one for each receive direction and for each receive direction, a time unit may be further subdivided into each of transmit directions. So when the multi-direction RTS or CTS is sent, a RTS or CTS frame is sent in all of these time slots. However, when a unidirectional RTS or CTS is sent, only one of the slot may be used which may correspond to the receive and transmit direction.

If a quasi-omni antenna is used at the receiver, e.g., receiver directions are much less than the number of time units Rr over which RTS/CTS is received, then energy combining may be performed over multiple receive directions to increase SNR and recover loss due to absence of beamforming gain. Similarly when a quasi-omni antenna is used at the transmitter, then the transmitter may resend the same RTS/CTS packet in multiple time units. If the receiver is aware of this process, it can perform energy combining over those slots to recover the SNR lost in absence of beamforming.

There are multiple ways in which a lighthouse RTS-CTS may be used for beam-training purposes. For example, RTS and CTS are control frames and their headers may have fields that indicate the transmit direction index and best receive direction index. So when a RTS is sent by STA B, it includes the transmit direction index. In the CTS sent by STA A, it includes the transmit direction of CTS. In addition CTS contains the information of best transmit direction index at B and best receive direction index at A, the information determined from the decoding of RTS frame with highest SNR. An Acknowledgement message is required from B to A to complete the beam training process where Acknowledgement tells A of the best transmit direction and the best receive direction of B.

In still another example, no beacon interval is reserved for beam training purposes. Rather, we can assume that Rr and Rt do not cover the total number of receive and transmit beam directions used by receiver and transmitter. But STAs according to some device specific algorithm is switching from one interval to a different transmit and/or receive directions it is using. In that case, STA can only reserve a part of the space over which beam training can be performed at one go. A Beam_Train_Required field is set to indicate to the peer entity the desire to beam train for the duration reserved In another example, a part of a superframe reserved for beam training 416 purposes. In that case, the RTS and CTS can use a Beam_Train_Required field in their header to indicate if they intend to used this interval for beam training purposes. As such, No extra resources may be reserved and STA A and B may use this period to perform beam training.

Figure 5:
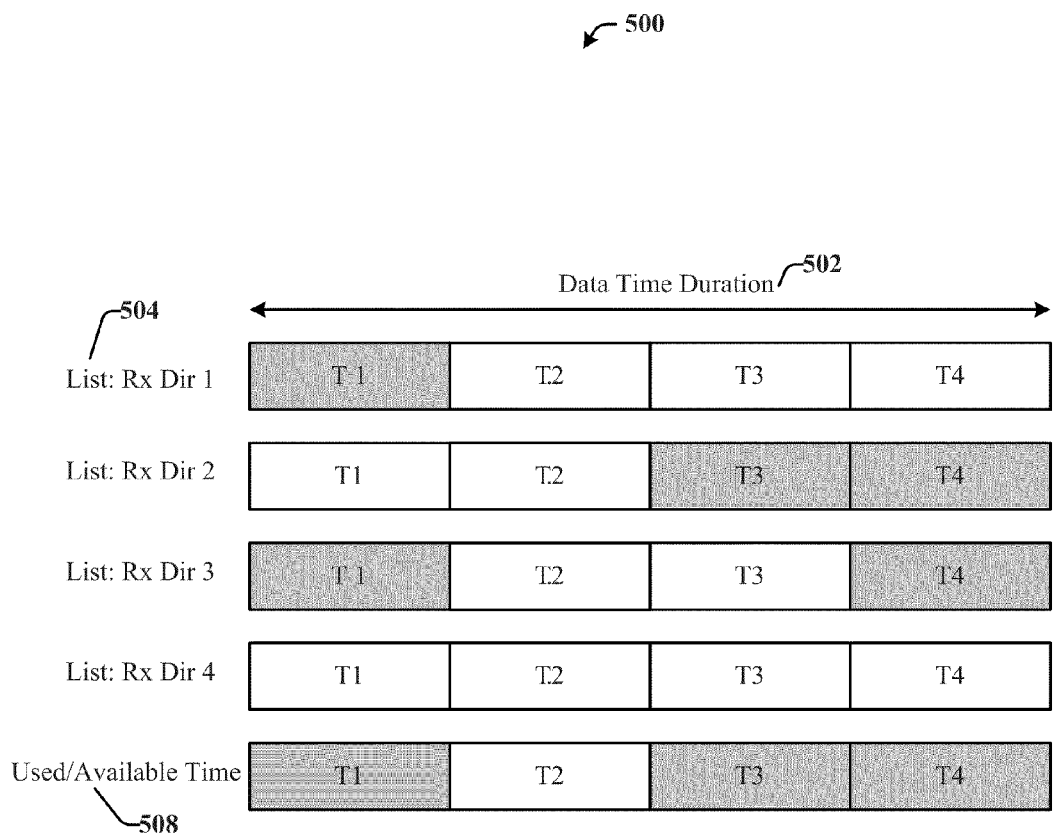
FIG. 5 illustrates channel availability for multiple receiving directions according to an aspect.

With reference to FIG. 5, an example chart including channel availability for multiple receiving directions is depicted. In operation, each STA may maintains a list of List of Reserved Channel Time 504 along each of its receive directions. In one aspect, in each time unit the list is updated. Further, a STA may determine Available_Channel_Time(r) 508 along the receive beam direction r based on the List(r). Further, Available_Channel_Time along a set of receive beam directions 502 may be the common Available_Channel_Time along each receive direction.

Figure 6:
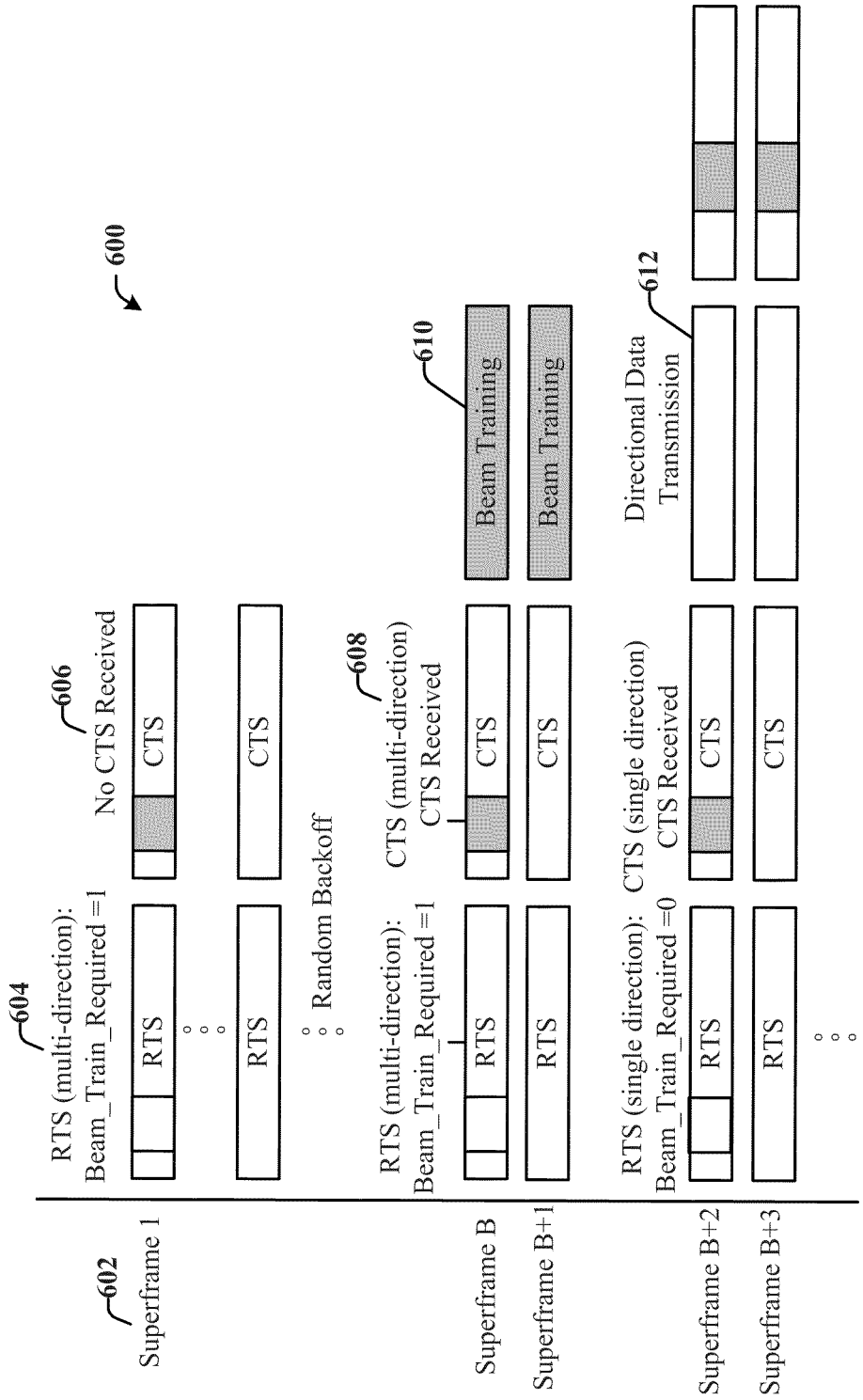
FIG. 6 illustrates a block diagram example of a hieratical RTS-CTS protocol for a directional communication network according to an aspect.

With reference to FIG. 6, a block diagram example of a hieratical RTS_CTS protocol for a directional communication network is depicted. Whether a multi-direction or unidirectional RTS-CTS are sent, any STA that decoded RTS or CTS defers its transmission for the duration of the reserved period. In operation, STA may choose Rt transmit directions and finds the receive beam directions covering Rt transmit directions. In one aspect, for symmetric and calibrated antenna systems, this value can be determined In one aspect, for asymmetric un-calibrated Tx-Rx antenna systems, STA may consider all its receive beam directions. Thereafter, STA may determine Available_Channel_Time along the set of receive beam directions determined in the first step and sends an RTS control Frame in lighthouse fashion (Rt×Rr) in RTS part of the Control. If C wants to beam train with B, Beam_Train_Required field is set. Further, RTS may also contain the Channel_Time_Requested. Target STA B on receiving the RTS, determines Available_Channel_Time (same as STA) and sends a CTS in CTS part of the Control.— CTS contains a Channel_Time (period common to Available_Channel_Time at C and Channel_Time_Requested in RTS). (RTS/CTS correctly received) If Beam_Train_Required field is set to 1, there may be two options: When Superframe has a reserved Beam Training Period, C and B use the Period for beam training and Channel_Time_Allocated in CTS can be set to 0, and When no Beam Training Period is reserved, C and B use the Channel_Time allocated in CTR and beam train along the Rt×Rr directions. By contrast, if RTS.CTS is not received, STA C performs a random backoff along the directions where RTS was sent. After beam training 610 is performed, RTS/CTS can be used in the direction of communication.

Figure 7:
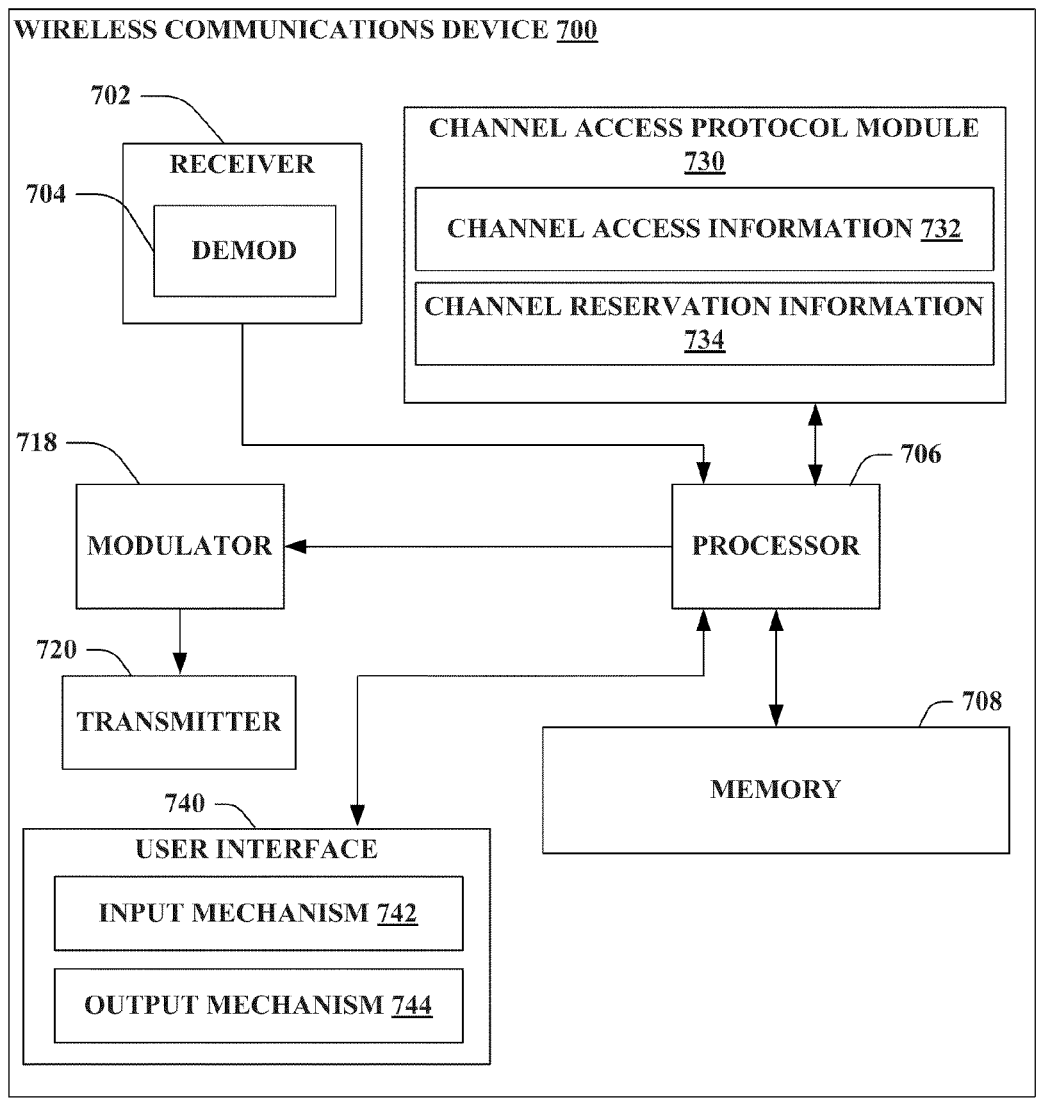
FIG. 7 illustrates a block diagram example architecture of a wireless communications device.

While still referencing FIG. 1, but turning also now to FIG. 7, an example architecture of wireless communications device 110 is illustrated. As depicted in FIG. 7, wireless communications device 700 comprises receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to processor 706 for channel estimation. Further, receiver 702 may receive signals from multiple networks using multiple communication protocols. In one aspect, receiver 702 may receive a signal from a network using at least one of: CDMA, WCDMA, TDMA, TD-SCDMA, UMTS, IP, GSM, LTE, WiMax, UMB, EV-DO, 802.11, BLUETOOTH, etc.

Processor 706 can be a processor dedicated to analyzing information received by receiver 702 and/or generating information for transmission by transmitter 720, a processor that controls one or more components of wireless communications device 700, and/or a processor that both analyzes information received by receiver 702, generates information for transmission by transmitter 720, and controls one or more components of wireless communications device 700.

Wireless communications device 700 can additionally comprise memory 708 that is operatively coupled to, and/or located in, processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

Wireless communications device 700 can further include channel access protocol module 730 may be operable to enable a hierarchical RTS-CTS based protocol. In one aspect, the hierarchical RTS-CTS based protocol may perform apparatus discovery and beam training over a broad coverage region and may perform channel reservation and data transfer of a directional beam established during beam training. As such, channel access protocol module 730 may include channel access information 732 and channel reservation information 734. In one an aspect, channel access information 732 may include a request message to determine at least one of the presence or location of an apparatus. In another aspect, channel access information 732 may include a field for beam training information. Further, in another aspect, channel reservation information 734 be operable allow the WCD 700 to establish a communication session of a reserved channel.

Additionally, wireless communications device 700 may include user interface 740. User interface 740 may include input mechanisms 742 for generating inputs into communications device 700, and output mechanism 742 for generating information for consumption by the user of the communications device 700. For example, input mechanism 742 may include a mechanism such as a key or keyboard, a mouse, a touch-screen display, a microphone, etc. Further, for example, output mechanism 744 may include a display, an audio speaker, a haptic feedback mechanism, a Personal Area Network (PAN) transceiver etc. In the illustrated aspects, the output mechanism 744 may include a display operable to present media content that is in image or video format or an audio speaker to present media content that is in an audio format.

Figure 8:
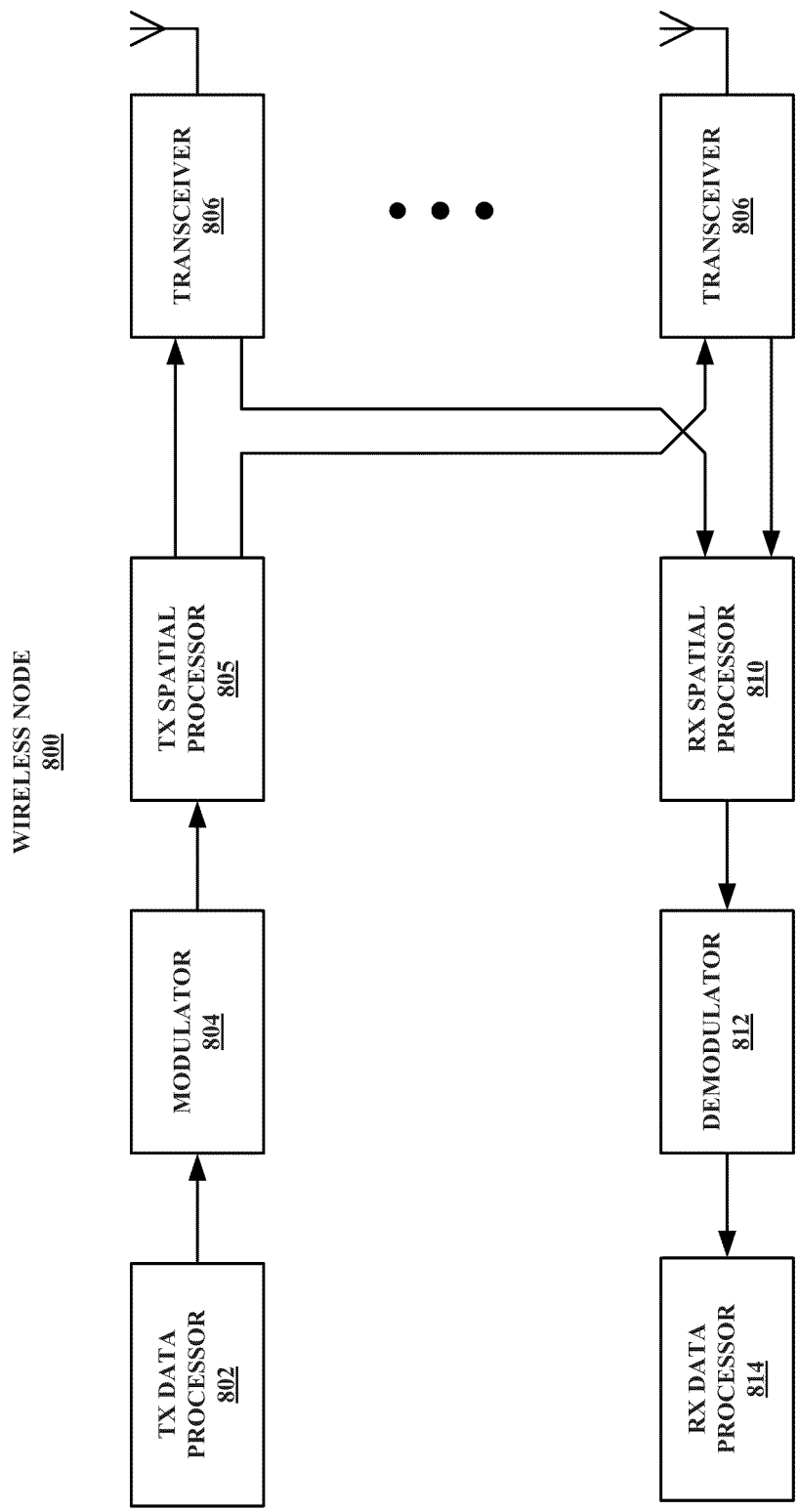
FIG. 8 illustrates another block diagram example architecture of a wireless node.

FIG. 8 is a conceptual block diagram illustrating an example of the signal processing functions of the PHY layer. In a transmit mode, a TX data processor 802 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 802 to produce a sequence of modulation symbols.

In wireless nodes, the modulation symbols from the TX data processor 802 may be provided to a modulator 804 (e.g., an OFDM modulator). The modulator splits the modulation symbols into parallel streams. Each stream is then mapped to an subcarrier and then combined together using an Inverse Fast Fourier Transform (IFFT) to produce a time domain stream.

A TX spatial processor 806 performs spatial processing on the stream. This may be accomplished by spatially precoding each stream and then providing each spatially precoded stream to a different antenna 808 via a transceiver 806. Each transmitter 806 modulates an RF carrier with a respective precoded stream for transmission over the wireless channel.

In a receive mode, each transceiver 806 receives a signal through its respective antenna 808. Each transceiver 806 may be used to recover the information modulated onto an RF carrier and provide the information to a RX spatial processor 810.

The RX spatial processor 810 performs spatial processing on the information to recover any spatial streams destined for the wireless node 800. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 800, they may be combined by the RX spatial processor 810.

In wireless nodes, the stream (or combined stream) from the RX spatial processor 810 is provided to a demodulator 812 (e.g., a OFDM demodulator. The demodulator 812 converts the stream (or combined stream) from time-domain to the frequency domain using a Fast Fourier Transform (FFT). The frequency domain signal comprises a separate stream for each subcarrier of the signal. The demodulator 812 recovers the data (i.e., modulation symbols) carried on each subcarrier and multiplexes the data into a stream of modulation symbols.

A RX data processor 814 may be used to translate the modulation symbols back to the correct point in the signal constellation. Because of noise and other disturbances in the wireless channel, the modulation symbols may not correspond to an exact location of a point in the original signal constellation. The RX data processor 814 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 814 then uses the sequence of code symbol LLRs in order to decode the data that was originally transmitted before providing the data to the MAC layer.

Figure 9:
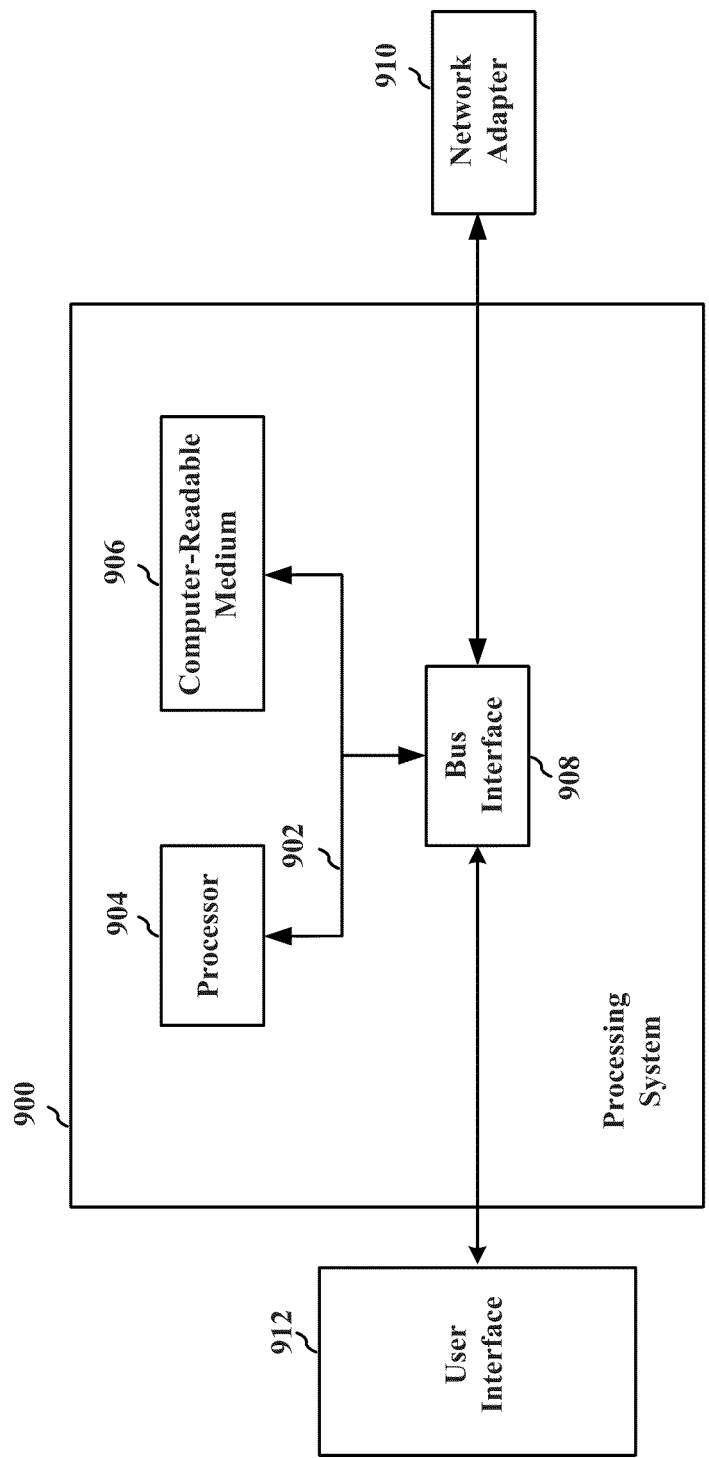
FIG. 9 illustrates a conceptual diagram illustrating an example of a hardware configuration for a processing system in a wireless node.

FIG. 9 is a conceptual diagram illustrating an example of a hardware configuration for a processing system in a wireless node. In this example, the processing system 900 may be implemented with a bus architecture represented generally by bus 902. The bus 902 may include any number of interconnecting buses and bridges depending on the specific application of the processing system 900 and the overall design constraints. The bus links together various circuits including a processor 904, computer-readable media 906, and a bus interface 908. The bus interface 908 may be used to connect a network adapter 910, among other things, to the processing system 900 via the bus 902. The network interface 910 may be used to implement the signal processing functions of the PHY layer. In the case of an access terminal 110 (see FIG. 1), a user interface 912 (e.g., keypad, display, mouse, joystick, etc.) may also be connected to the bus via the bus interface 908. The bus 902 may also link various other circuits such as timing sources, peripherals, voltage regulators, power management circuits, and the like, which are well known in the art, and therefore, will not be described any further.

The processor 904 is responsible for managing the bus and general processing, including the execution of software stored on the computer-readable media 908. The processor 908 may be implemented with one or more general-purpose and/or special-purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

In the hardware implementation illustrated in FIG. 9, the computer-readable media 906 is shown as part of the processing system 900 separate from the processor 904. However, as those skilled in the art will readily appreciate, the computer-readable media 906, or any portion thereof, may be external to the processing system 900. By way of example, the computer-readable media 906 may include a transmission line, a carrier wave modulated by data, and/or a computer product separate from the wireless node, all which may be accessed by the processor 904 through the bus interface 908. Alternatively, or in addition to, the computer readable media 904, or any portion thereof, may be integrated into the processor 904, such as the case may be with cache and/or general register files.

The processing system 900, or any part of the processing system, may provide the means for performing the functions recited herein. Further, any apparatus or system described herein may provide the means for performing the functions recited herein. By way of example, transmitter 806 may provide the means for transmitting channel access information to a plurality of apparatuses. Further, by way of example, receiver 706 may provide the means for receiving a first directional beam from a second apparatus of the plurality of apparatuses, wherein the first directional beam is determined by the second apparatus based on the received channel access information. Further, by way of example, the processing system 900 executing code may provide means for determining a second directional beam based on the first directional beam. Still further, transmitter 806 may provide the means for transmitting a channel reservation to the second apparatus using the second directional beam. Moreover, the processing system 900 executing code may provide means for establishing a communication session with the second apparatus based on the channel reservation. Alternatively, the code on the computer-readable medium may provide the means for performing the functions recited herein.

By way of another example, receiver 706 may provide the means for receiving a channel access information transmission from a second apparatus. Further, by way of example, the processing system 900 executing code may provide means for determining the channel access information is not intended for the first apparatus, means for determining a direction from which the channel access information transmission was received, and means for deferring transmissions, from the first apparatus, in the direction from which the channel access information transmission was received.

Those skilled in the art will recognize how best to implement the described functionality presented throughout this disclosure depending on the particular application and the overall design constraints imposed on the overall system.

Figure 10:
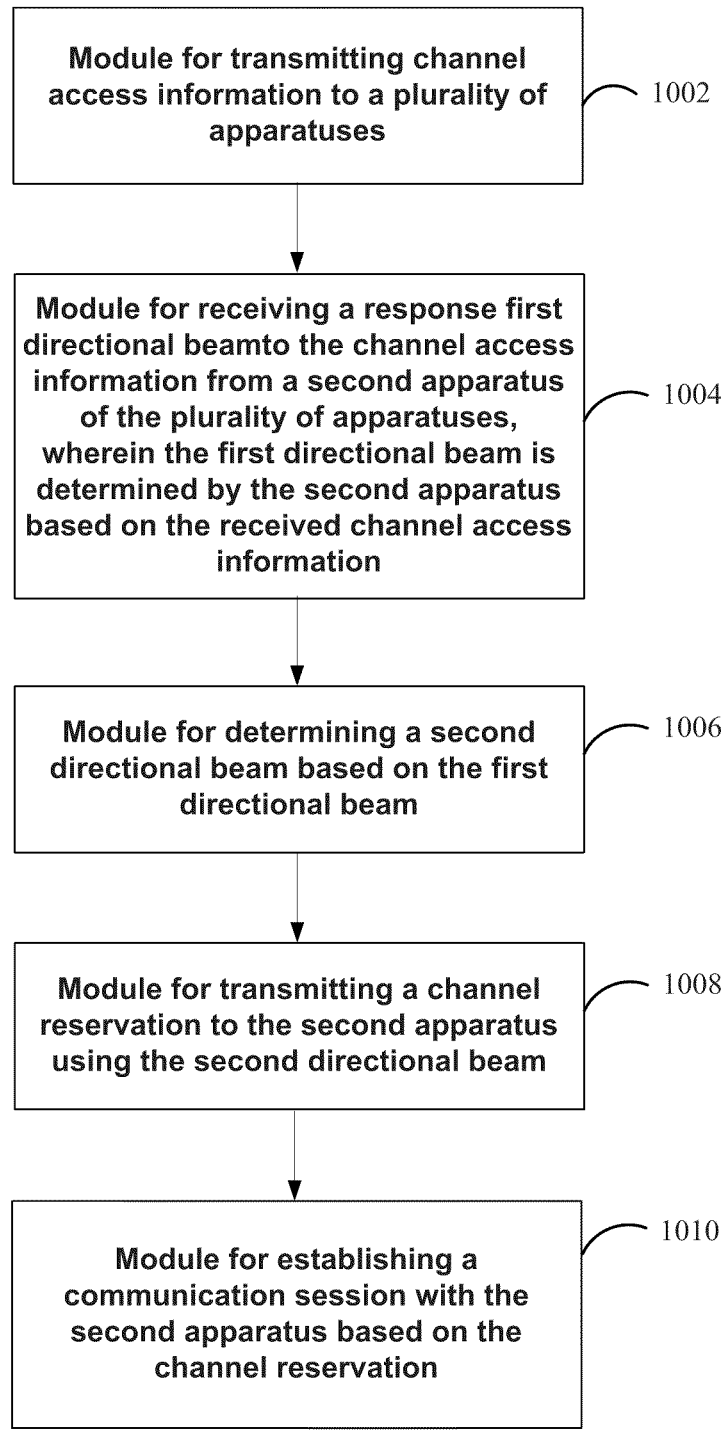
FIG. 10 is a conceptual block diagram illustrating the functionality of an example apparatus.

FIG. 10 is a conceptual block diagram 1000 illustrating the functionality of an exemplary apparatus 900. The apparatus 900 includes a module 1002 that transmits channel access information to a plurality of apparatuses, a module 1004 that receives a first directional beam from a second apparatus of the plurality of apparatuses, wherein the first directional beam is determined by the second apparatus based on the received channel access information, a module 1006 that determines a second directional beam based on the first directional beam, a module 1008 that transmits a channel reservation to the second apparatus using the second directional beam, and a module 1010 that establishes a communication session with the second apparatus based on the channel reservation.

Figure 11:
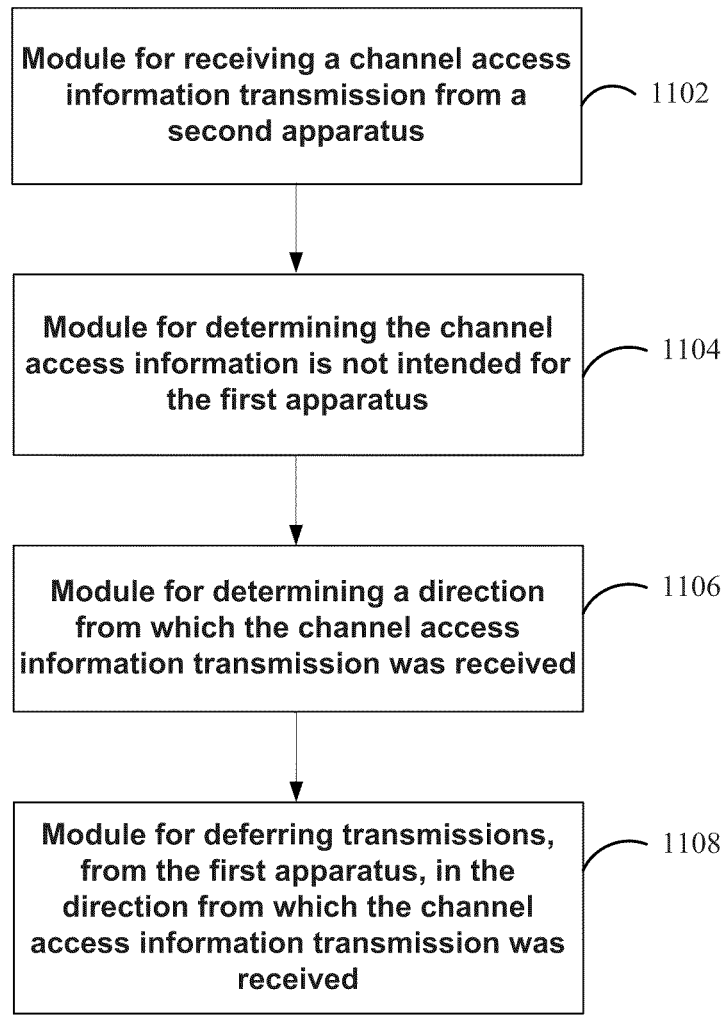
FIG. 11 is another conceptual block diagram illustrating the functionality of an example apparatus.

FIG. 11 is a conceptual block diagram 1100 illustrating the functionality of an exemplary apparatus 900. The apparatus 900 includes a module 1102 that receives a channel access information transmission from a second apparatus, a module 1104 that determines the channel access information is not intended for the first apparatus, a module 1106 that determines a direction from which the channel access information transmission was received, and a module 1108 that defers transmissions, from the first apparatus, in the direction from which the channel access information transmission was received.

Referring to FIG. 1 and FIG. 9, in one configuration, the apparatus 900 for wireless communication includes means for initiating, by a first apparatus, a listening period mode, wherein the listening period mode comprises means for ceasing at least a portion of current communication and means for configuring the first apparatus to receive a request to initiate a new communication, means for determining whether a request is received during a time period in the listening period mode, and means for transmitting a response if the request to initiate the new communication is received during the time period in the listening period mode. In another configuration, the apparatus 900 for wireless communication includes means for transmitting a beam training request message as part of the channel access information to the plurality of apparatuses. In another configuration, the apparatus 900 for wireless communication includes means for performing beam training during a reserved beam training interval of the superframe time interval, wherein the superframe comprises non-overlapping time intervals for the control time interval and the reserved beam training interval. In another configuration, the apparatus 900 for wireless communication includes means for transmitting over a wide beam by rotating a finer transmission beam of an antenna. In another configuration, the apparatus 900 for wireless communication includes means for receiving a beam training response message from the second apparatus. In another configuration, the apparatus 900 for wireless communication includes means for calculating a number of time slots between a reference time and a time when the beam training response message is received from the second apparatus. In another configuration, the apparatus 900 for wireless communication includes means for focusing the second directional beam in the direction of the second apparatus through beam training. In another configuration, the apparatus 900 for wireless communication includes means for transmitting a medium reservation request over the second directional beam to the second apparatus, and means for receiving a medium reservation response from the second apparatus establishing the communication session. In another configuration, the apparatus 900 for wireless communication includes means for deferring transmissions for a duration indicted by the channel access information. The aforementioned means is the processing system 900 configured to perform the functions recited by the aforementioned means. As described supra, the processing system 900 includes the TX Processor 816, the RX Processor 870, and the controller/processor 875. As such, in one configuration, the aforementioned means may be the TX Processor 816, the RX Processor 870, and the controller/processor 875 configured to perform the functions recited by the aforementioned means.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications, comprising:
   transmitting, by a first apparatus, channel access information to a plurality of apparatuses;
   receiving, by the first apparatus, a first directional beam from a second apparatus of the plurality of apparatuses, wherein the first directional beam is determined by the second apparatus based on the transmitted channel access information;
   determining a second directional beam based on the first directional beam;
   transmitting a channel reservation to the second apparatus using the second directional beam; and
   establishing a communication session with the second apparatus based on the channel reservation.

2. The method of claim 1, wherein the channel access information comprises a request message to determine at least one of the presence or direction of one or more of the plurality of apparatuses.

3. The method of claim 1, wherein at least one of presence or direction of the second apparatus is either not known to the first apparatus or partially known.

4. The method of claim 1, wherein the transmission of the channel access information comprises using a quasi omni-directional antenna.

5. The method of claim 1, wherein the transmission of the channel access information comprises transmitting over a wide beam by rotating a finer transmission beam of an antenna.

6. The method of claim 1, wherein the channel access information comprises at least one of a request to send (RTS) message or a clear to send (CTS) message.

7. The method of claim 6, wherein the channel access information is transmitted during a control time which is divided into multiple time division groups with a first group available for one or more RTS messages and a second group available for one or more CTS messages.

8. The method of claim 6, wherein the channel access information is transmitted during a control time which is divided into multiple time division parings with each pairing including available time for at least one of the RTS message or the CTS message.

9. The method of claim 1, wherein the channel access information is transmitted during a control time which is divided into multiple time slots wherein each time slot corresponds to a direction of transmission.

10. The method of claim 1, wherein the transmission of the channel access information further comprises transmitting a beam training request message as part of the channel access information to the plurality of apparatuses.

11. The method of claim 10, wherein the transmission of the channel access information further comprises transmitting over a wide beam by rotating a finer transmission beam of an antenna, and wherein the beam training request message comprises an index of transmission directions in which the channel access information is sent.

12. The method of claim 1, wherein the channel access information is transmitted during a control time interval of a superframe, and wherein the establishment of the communication session comprises performing beam training during a reserved beam training interval of the superframe time interval, wherein the superframe comprises non-overlapping time intervals for the control time interval and the reserved beam training interval.

13. The method of claim 1, wherein the reception of the first directional beam further comprises receiving a beam training response message from the second apparatus, wherein the beam training response message comprises a transmission beam index, and wherein the first directional beam is also based on the transmission beam index.

14. The method of claim 13, wherein the determination of the second directional beam further comprises calculating a number of time slots between a reference time and a time when the beam training response message is received from the second apparatus.

15. The method of claim 1, wherein the channel access information comprises a medium reservation request, and wherein the medium reservation request comprises at least one of:
   a transmission frequency, a bandwidth, or a transmission time.

16. The method of claim 1, wherein the channel access information comprises a medium reservation request, and wherein the medium reservation request is determined from a medium available in at least one receive direction of the first apparatus.

17. The method of claim 1, wherein the channel access information comprises a medium reservation request, and further comprising receiving a medium reservation response from the second apparatus, wherein the medium reservation response comprises at least one common medium between at least one medium indicated in the medium reservation request and at least one medium available to the second apparatus.

18. The method of claim 1, the wherein the determination of the second directional beam further comprises focusing the second directional beam in the direction of the second apparatus through beam training.

19. The method of claim 1, the wherein the establishment of the communication session comprises:
   transmitting a medium reservation request over the second directional beam to the second apparatus; and
   receiving a medium reservation response from the second apparatus establishing the communication session.

20. A Non-transitory computer program product, comprising:
   a computer-readable device encoded with instructions executable for:
      transmitting channel access information to a plurality of apparatuses;
      receiving a first directional beam from a second apparatus of the plurality of apparatuses, wherein the first directional beam is determined by the second apparatus based on the transmitted channel access information;
      determining a second directional beam based on the first directional beam;
      transmitting a channel reservation to the second apparatus using the second directional beam; and
      establishing a communication session with the second apparatus based on the channel reservation.

21. A first apparatus for wireless communications, comprising:
   means for transmitting channel access information to a plurality of apparatuses;
   means for receiving a first directional beam from a second apparatus of the plurality of apparatuses, wherein the first directional beam is determined by the second apparatus based on the transmitted channel access information;
   means for determining a second directional beam based on the first directional beam;
   means for transmitting a channel reservation to the second apparatus using the second directional beam; and
   means for establishing a communication session with the second apparatus based on the channel reservation.

22. A station, comprising:
   an antenna;
   a transmitter coupled to the antenna, configured to:
      transmit channel access information to a plurality of apparatuses;
   a receiver coupled to the antenna, configured to:
      receive a first directional beam from a second apparatus of the plurality of apparatuses, wherein the first directional beam is determined by the second apparatus based on the transmitted channel access information;
   a processing system configured to:
      determine a second directional beam based on the first directional beam;
      wherein the transmitter is further configured to:
      transmitting a channel reservation to the second apparatus using the second directional beam; and
      wherein the processing system is further configured to:
         establish a communication session with the second apparatus based on the channel reservation.

23. A first apparatus for wireless communications, comprising:
   a transmitter configured to:
      transmit channel access information to a plurality of apparatuses;
   a receiver configured to:
      receive a first directional beam from a second apparatus of the plurality of apparatuses, wherein the first directional beam is determined by the second apparatus based on the transmitted channel access information;
   a processing system configured to:
      determine a second directional beam based on the first directional beam;
      wherein the transmitter is further configured to:
         transmit a channel reservation to the second apparatus using the second directional beam; and
      wherein the processing system is further configured to:
         establish a communication session with the second apparatus based on the channel reservation.

24. The first apparatus of claim 23, wherein the channel access information comprises a request message to determine at least one of the presence or location of one or more of the plurality of apparatuses.

25. The first apparatus of claim 23, wherein at least one of presence or direction of the second apparatus is either not known to the first apparatus or partially known.

26. The first apparatus of claim 23, wherein the transmission of the channel access information comprises using a quasi omni-directional antenna.

27. The first apparatus of claim 23, wherein the transmission of the channel access information comprises transmitting over a wide beam by rotating a finer transmission beam of an antenna.

28. The first apparatus of claim 23, wherein the channel access information comprises at least one of a RTS message or a CTS message.

29. The first apparatus of claim 28, wherein the channel access information is transmitted during a control time which is divided into multiple time division groups with a first group available for one or more RTS messages and a second group available for one or more CTS messages.

30. The first apparatus of claim 28, wherein the channel access information is transmitted during a control time which is divided into multiple time division parings with each pairing including available time for at least one of the RTS message or the CTS message.

31. The first apparatus of claim 23, wherein the channel access information is transmitted during a control time which is divided into multiple time slots wherein each time slot corresponds to a direction of transmission.

32. The first apparatus of claim 23, wherein the transmitter is configured to transmit a beam training request message as part of channel access information to the plurality of apparatuses.

33. The first apparatus of claim 23, wherein the channel access information is transmitted during a control time interval of a superframe, and wherein the processing system is further configured to perform beam training during a reserved beam training interval of the superframe time interval, wherein the superframe comprises non-overlapping time intervals for the control time interval and the reserved beam training interval.

34. The first apparatus of claim 32, wherein the transmitter is further configured to transmit the channel access information over a wide beam by rotating a finer transmission beam of an antenna, and wherein the beam training request message comprises an index of transmission directions in which the channel access information is sent.

35. The first apparatus of claim 23, wherein the receiver is further configured to receive a beam training response message from the second apparatus during establishment of the directional beam, wherein the beam training response message comprises a transmission beam index, and wherein the first directional beam of the second apparatus is also based on from the transmission beam index.

36. The first apparatus of claim 35, wherein the processing system is configured to calculate a number of time slots between a reference time and a time when the beam training response message is received from the second apparatus.

37. The first apparatus of claim 23, wherein the channel access information comprises a medium reservation request, and
wherein the medium reservation request comprises at least one of: a transmission frequency, a bandwidth, or a transmission time.

38. The first apparatus of claim 23, wherein the channel access information comprises a medium reservation request, and wherein the processing system is further configured to determine the medium reservation request from medium available in at least one receive direction of the first apparatus.

39. The first apparatus of claim 23, wherein the channel access information comprises a medium reservation request, and wherein the receiver is further configured to receive a medium reservation response from the second apparatus, wherein the medium reservation response comprises at least one common medium between at least one medium indicated in the medium reservation request and at least one medium available to the second apparatus.

40. The first apparatus of claim 23, wherein the processing system is configured to focus the second directional beam in the direction of the second apparatus through beam training 41. The first apparatus of claim 23, wherein the transmitter is configured to:
transmit a medium reservation request over the second directional beam to the second apparatus; and
receive a medium reservation response from the second apparatus establishing the communication session.

42. A method of wireless communications, comprising:
receiving, by a first apparatus, a channel access information transmission from a second apparatus;
determining the channel access information is not intended for the first apparatus;
determining a direction from which the channel access information transmission was received; and
deferring transmissions, from the first apparatus, in the direction from which the channel access information transmission was received.

43. The method of claim 42, wherein the deferring transmissions further comprises deferring transmissions for a duration indicted by the channel access information.

44. The method of claim 43, wherein the duration is indicated through a RTS message.

45. The method of claim 42, wherein the channel access information transmission is received during a control time which is divided into multiple time slots wherein one of the time slots corresponds to the direction from which the channel access information transmission was received.

46. A Non-transitory computer program product, comprising:
a computer-readable device encoded with instructions executable for:
receiving, by a first apparatus, a channel access information transmission from a second apparatus;
determining the channel access information is not intended for the first apparatus;
determining a direction from which the channel access information transmission was received; and
deferring transmissions, from the first apparatus, in the direction from which the channel access information transmission was received.

47. A first apparatus for wireless communications, comprising:
means for receiving, by the first apparatus, a channel access information transmission from a second apparatus;
means for determining the channel access information is not intended for the first apparatus;
means for determining a direction from which the channel access information transmission was received; and
means for deferring transmissions, from the first apparatus, in the direction from which the channel access information transmission was received.

48. A station, comprising:
an antenna;
a receiver coupled to the antenna, configured to:
receive, by the station, a channel access information transmission from a second apparatus; and
a processing system configured to:
determine the channel access information is not intended for the first apparatus;
determine a direction from which the channel access information transmission was received; and
defer transmissions, from the station, in the direction from which the channel access information transmission was received.

49. An apparatus for wireless communications, comprising:
a receiver configured to:
receive, by the apparatus, a channel access information transmission from a first apparatus; and
a processing system configured to:
determine the channel access information is not intended for the f apparatus;
determine a direction from which the channel access information transmission was received; and
defer transmissions, from the apparatus, in the direction from which the channel access information transmission was received for a duration indicted by a field in the channel access information.

50. The apparatus of claim 49, wherein the deferring transmissions further comprises deferring transmissions for a duration indicted by the channel access information.

51. The apparatus of claim 50, wherein the duration is indicated through a RTS message.

52. The apparatus of claim 49, wherein the channel access information transmission is received during a control time which is divided into multiple time slots wherein one of the time slots corresponds to the direction from which the channel access information transmission was received.

* * * * *